(12) United States Patent
Park et al.

(10) Patent No.: US 11,279,257 B2
(45) Date of Patent: Mar. 22, 2022

(54) VALVE MODULE FOR A COOLING SYSTEM OF AN ELECTRIC VEHICLE

(71) Applicants: Hyundai Motor Company, Seoul (KR); Kia Motors Corporation, Seoul (KR)

(72) Inventors: Danghee Park, Seoul (KR); Hyun Il Kim, Gyeonggi-do (KR); Kyeongho Kim, Gyeonggi-do (KR); Soo Young Kwak, Gyeonggi-do (KR); Seungyeon Han, Gyeonggi-do (KR); Minsu Woo, Gyeonggi-do (KR); Seonki Hwang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 166 days.

(21) Appl. No.: 16/513,221

(22) Filed: Jul. 16, 2019

(65) Prior Publication Data

US 2020/0269723 A1 Aug. 27, 2020

(30) Foreign Application Priority Data

Feb. 27, 2019 (KR) .................. 10-2019-0023226

(51) Int. Cl.
*B60L 58/26* (2019.01)
*B60H 1/00* (2006.01)
(Continued)

(52) U.S. Cl.
CPC .......... *B60L 58/26* (2019.02); *B60H 1/00278* (2013.01); *B60H 1/00392* (2013.01);
(Continued)

(58) Field of Classification Search
CPC ............ B60H 1/00278; B60H 1/00392; B60H 2001/00307; B60L 3/0046; B60L 58/26;
(Continued)

(56) References Cited

U.S. PATENT DOCUMENTS

| 3,889,879 | A | * | 6/1975 | Wellman | ................ | B60K 11/02 237/12.3 B |
| 2012/0168138 | A1 | * | 7/2012 | Myers | ..................... | F28F 27/02 165/200 |
| 2014/0205881 | A1 | * | 7/2014 | Elsaesser | ............ | H01M 10/625 429/120 |
| 2015/0013367 | A1 | * | 1/2015 | Carpenter | ........... | H01M 10/625 62/222 |

(Continued)

OTHER PUBLICATIONS

Park et al., "Effect of Thermal Management of Lithium-Ion Battery on Driving Range of Electric Vehicle", Journal of the Korea Academia-Industrial cooperation Society, vol. 18, No. 5 pp. 22-28, 2017.

*Primary Examiner* — Eric S Ruppert
*Assistant Examiner* — Hans R Weiland
(74) *Attorney, Agent, or Firm* — Mintz Levin Cohn Ferris Glovsky and Popeo, P.C.; Peter F. Corless

(57) ABSTRACT

A cooling system of an electric vehicle is provided. The system includes an integral valve having at least one or more coolant inlets and at least two or more coolant outlets, and selectively discharges a coolant through one of the at least two or more coolant outlets. A plurality of coolant paths connected such that the coolant discharged through one of the at least two or more coolant outlets is introduced back into the integral valve through the at least one or more coolant inlets after being supplied to a portion where coolant circulation is required. A heat pump device is disposed in at least one or more of the plurality of coolant paths to selectively increase or decrease a temperature of the coolant.

25 Claims, 5 Drawing Sheets

(51) Int. Cl.
  *B60K 11/02* (2006.01)
  *B60L 3/00* (2019.01)

(52) U.S. Cl.
  CPC .......... *B60H 1/00907* (2013.01); *B60K 11/02* (2013.01); *B60L 3/0046* (2013.01); *B60H 2001/00307* (2013.01); *B60H 2001/00935* (2013.01)

(58) Field of Classification Search
  CPC .............. B60K 11/02; B60K 2001/003; B60K 2001/005; B60K 2001/006; H01M 10/613; H01M 10/615; H01M 10/625; H01M 10/6568; H01M 10/663; H01M 2220/20
  See application file for complete search history.

(56) References Cited

U.S. PATENT DOCUMENTS

| | | | |
|---|---|---|---|
| 2015/0101789 A1* | 4/2015 | Enomoto | B60K 11/02 165/202 |
| 2016/0023532 A1* | 1/2016 | Gauthier | H01M 10/625 62/243 |
| 2016/0107501 A1* | 4/2016 | Johnston | B60H 1/00278 165/202 |
| 2016/0167481 A1* | 6/2016 | Makihara | B60K 11/02 237/5 |
| 2016/0344075 A1* | 11/2016 | Blatchley | H01M 10/625 |
| 2017/0158081 A1* | 6/2017 | Kim | B60H 1/00278 |
| 2017/0324132 A1* | 11/2017 | Kenney | H01M 10/625 |
| 2018/0086224 A1* | 3/2018 | King | H01M 10/613 |
| 2018/0117984 A1* | 5/2018 | Kim | B60L 58/26 |
| 2019/0070924 A1* | 3/2019 | Mancini | B60L 58/26 |
| 2019/0275858 A1* | 9/2019 | Seki | B60H 1/00278 |

* cited by examiner

VALVE MODULE FOR A COOLING SYSTEM OF AN ELECTRIC VEHICLE

CROSS-REFERENCE TO RELATED APPLICATION

This application claims priority to and the benefit of Korean Patent Application No. 10-2019-0023226 filed on Feb. 27, 2019, the entire contents of which are incorporated herein by reference.

BACKGROUND

(a) Field of the Invention

The present invention relates to a cooling system of an electric vehicle, and more particularly, to a cooling system of an electric vehicle for improving cooling efficiency of an electrically powered device.

(b) Description of the Related Art

In general, an electric vehicle (EV) is equipped with a driving motor, a transmission, and power electronics (PE). Particularly, the term "electric vehicle" is a generic term for a vehicle in which electrical power is used as power. The power electronics include an inverter, a direct current-direct current (DC-DC) converter, a junction box, a virtual engine sound system (VESS), and a charger. The inverter is a device that converts direct current power to alternating current (AC) power, and the DC-DC converter is an electronic circuit device that converts a DC voltage of a certain voltage to a DC voltage of a different voltage. In addition, the junction box is a box for interconversion of several single connectors and a multi-connector, and the charger charges a high-voltage battery of the electric vehicle.

In an electric vehicle, cooling of the high-voltage battery and the electrically powered electronic components affects the performance of the vehicle, and determines the lifetime of the high-voltage battery and the electrically powered electronic components. To effectively implement the cooling, a method of changing the circulation path of the coolant based on an operating state of the vehicle is used.

Particularly, in the method of changing the circulation path of the coolant, a method of decreasing a temperature of the coolant using a battery chiller or a method of increasing the temperature of the coolant using a battery heater is used. The methods improve the efficiency of the high voltage battery but require a complex layout of coolant paths and require components to differentiate the circulation paths of the coolant, and in the complex layout of the coolant paths, the number of parts may be increased to differentiate the circulation paths of the coolant and there may be a spatial constraint in arrangement of the battery chiller and the battery heater on the coolant paths.

The above information disclosed in this section is merely for enhancement of understanding of the background of the invention and therefore it may contain information that does not form the prior art that is already known in this country to a person of ordinary skill in the art.

SUMMARY

The present invention provides a cooling system of an electric vehicle, which improves cooling efficiency of an electrically powered device with a simple configuration while omitting a configuration such as a battery chiller and a battery heater.

A cooling system of an electric vehicle according to an exemplary embodiment of the present invention, changes a circulation path of a coolant according to operation of a valve module that may include: an integral valve that supplies a coolant to a portion where circulation of the coolant is required while cooling a power source of the vehicle, and then receives the coolant to supply the received coolant back to the power source and the portion where the coolant circulation is required; an integral valve inlet path, which is a first inlet through which the coolant may be introduced into the integral valve; a first integral valve outlet path, which is a first outlet through which the coolant may be selectively discharged from the integral valve; a second integral valve outlet path, which is a second coolant outlet through which the coolant may be selectively discharged from the integral valve; a heat pump device through which the coolant passed through the integral valve always passes, and where a heat pump may be embedded to selectively adjust a temperature of the coolant; a heat pump device inlet path, which is an inlet through which the coolant may be introduced into the heat pump device; a heat pump device outlet path, which is an outlet through which the coolant may be discharged from the heat pump device; an integral circulation portion in communication with the first integral valve outlet path, the second integral valve outlet path, and the heat pump device inlet path such that the coolant passed through the first integral valve outlet path or the second integral valve outlet path is introduced into the heat pump device; an integral circulation portion outlet path, which is an outlet that is different from the heat pump device inlet path through which the coolant may be discharged from the integral circulation portion; and an integral circulation portion inlet path, which is an inlet that is different from the first integral valve outlet path and the second integral valve outlet path through which the coolant may be introduced into the integral circulation portion.

The integral valve inlet path, the first integral valve outlet path, and the second integral valve outlet path may be formed in the integral valve. The heat pump device inlet path and the heat pump device outlet path may be formed in the heat pump device. The integral circulation portion outlet path and the integral circulation portion inlet path may be formed in the integral circulation portion. The integral circulation portion outlet path may be disposed while opposing the first integral valve outlet path to discharge the coolant introduced into the integral circulation portion through the first integral valve outlet path.

The integral circulation portion outlet path and the first integral valve outlet path may be disposed on the same line along a length direction of the integral circulation portion, which is a direction in which the coolant circulates in the integral circulation portion, the second integral valve outlet path may be disposed between the integral valve outlet path and the heat pump device inlet path, and the integral circulation portion inlet path may be disposed between the first integral valve outlet path and the second integral valve outlet path.

The valve module may further include a check valve disposed between the second integral valve outlet path and the integral circulation portion inlet path in the length direction of the integral circulation portion to prevent a coolant that has passed through the second integral valve outlet path from flowing backward toward the first integral valve outlet path, the integral circulation portion outlet path, and the integral circulation portion inlet path when circulating to the heat pump device inlet path through the integral circulation portion.

Additionally, the valve module may include: a heating branch path that communicates with the heat pump device outlet path as a first coolant path branched from the heat pump device inlet path; a cooling branch path that communicates with the heat pump device outlet path as a second coolant path branched from the heat pump device inlet path; a heating portion disposed in the heating branch path to selectively increase a temperature of the coolant passing through the heating branch path, as a part of a heat pump embedded in the heat pump device; a cooling portion disposed in the cooling branch path to selectively decrease a temperature of the coolant passing through the cooling branch path, as a part of the heat pump embedded in the heat pump device; and a conversion valve disposed in a portion where the heating branch path and the cooling branch path are branched from the heat pump device inlet path and allows the coolant passed through the heat pump device inlet path to pass through at least one of the heating branch path and the cooling branch path.

The heating branch path and the cooling branch path may be formed in the heat pump device. The coolant discharged through the integral circulation portion outlet from the integral circulation portion may be introduced into the integral circulation portion through the integral circulation portion inlet path after passing through a first circulation path, and a radiator may be provided on the first circulation path to cause a coolant passing through the first circulation path to pass through the radiator. The coolant discharged through the heat pump device outlet path from the heat pump device may be introduced through the integral valve inlet path after passing through a second circulation path, and an electrically powered device may be provided on the second circulation path to cause the coolant passing through the second circulation path to pass through the electrically powered device.

The heat pump device may further include: a high-temperature refrigerant inlet connected to a first end of the heating portion to introduce a high-temperature refrigerant to the heating portion therethrough; a high-temperature refrigerant outlet connected to a second end of the heating portion to discharge the high-temperature refrigerant introduced into the heating portion from the heating portion therethrough; a low-temperature refrigerant inlet connected to a first end of the cooling portion to introduce a low-temperature refrigerant into the cooling portion therethrough; a low-temperature refrigerant outlet connected to a second end of the cooling portion to discharge the low-temperature refrigerant introduced into the cooling portion from the cooling portion therethrough; an evaporator disposed between the high-temperature refrigerant outlet and the low-temperature refrigerant inlet; and a heat pump condenser disposed between the low-temperature refrigerant outlet and the high-temperature refrigerant inlet.

The evaporator may be configured to cool a refrigerant while the refrigerant sequentially passing through the high-temperature refrigerant outlet, the evaporator, and low-temperature refrigerant inlet. The heat pump condenser may be configured to heat the refrigerant while the refrigerant sequentially passing through the low-temperature refrigerant outlet, the heat pump condenser, and the high temperature refrigerant inlet.

A refrigerant circulation path may be provided in the heating portion to connect the high-temperature refrigerant inlet and the high-temperature refrigerant outlet for heat exchange between the refrigerant and the coolant while being distinguished from a path of the coolant, and a refrigerant circulation path may be provided in the cooling portion to connect the low-temperature refrigerant inlet and the low-temperature refrigerant outlet for heat exchange between the refrigerant and the coolant while being distinguished from a path of the coolant. A refrigerant used in an air conditioning system of a vehicle may be circulated.

When the integral valve operates to open the first integral valve outlet path and close the second integral valve outlet path, the coolant discharged through the first integral valve outlet path from the integral valve may sequentially pass through the integral circulation portion, the integral circulation portion outlet path, the first circulation path, the integral circulation portion inlet path, the integral circulation portion, and the heat pump device inlet path, and then may be introduced into the heat pump device.

When the conversion valve operates to open the heating branch path and close the cooling branch path, the coolant introduced into the heat pump device may be increased in temperature through the heating portion while passing through the heating branch path, and then may be introduced into the integral valve after sequentially passing through the heat pump device outlet path, the second circulation path, and the integral valve.

The operation of the integral valve may be performed when a coolant requires cooling using the radiator in a coolant high-temperature environment. The operation of the conversion valve may be performed when the coolant cooled through the radiator requires heating. When the conversion valve operates to close the heating branch path and open the cooling branch path, the coolant introduced into the heat pump device may be decreased in temperature through the cooling portion while passing through the cooling branch path, and then may be introduced into the integral valve after sequentially passing through the heat pump device outlet path, the second circulation path, and the integral valve inlet path.

The operation of the integral valve may be performed when a coolant requires cooling using the radiator in a coolant high-temperature environment. The operation of the conversion valve may be performed when the coolant requires further cooling even after passing through the radiator. When the integral valve operates to close the first integral valve outlet path and open the second integral valve outlet path, the coolant discharged through the second integral valve outlet path from the integral valve may be introduced into the heat pump device after sequentially passing through the integral circulation portion and the heat pump device inlet path.

When the conversion valve operates to open the heating branch path and close the cooling branch path, the coolant introduced into the heat pump device may be increased in temperature through the heating portion while passing through the heating branch path and then may be introduced into the integral valve after sequentially passing through the heat pump device outlet path, the second circulation path, and the integral valve inlet path. The operation of the integral valve may be performed when the coolant does not require cooling using the radiator in a coolant low-temperature environment, and the operation of the conversion valve may be performed when the coolant requires heating even though the coolant did not pass through the radiator.

When the conversion valve operates to close the heating branch path and open the cooling branch path, the coolant introduced into the heat pump device may be decreased in temperature through the cooling portion while passing through the cooling branch path, and then may be introduced into the integral valve after sequentially passing through the heat pump device outlet path, the second circulation path, and the integral valve inlet path. The operation of the integral valve may be performed when the coolant does not require cooling using the radiator in a coolant low-temperature environment, and the operation of the conversion valve may be performed when the coolant that did not pass through the radiator requires cooling.

A cooling system of an electric vehicle according to an exemplary embodiment of the present invention may include: an integral valve having at least one or more coolant inlets and at least two or more coolant outlets, and configured to selectively discharge a coolant through one of the at least two or more coolant outlets; a plurality of coolant paths that are connected with each other such that the coolant discharged through one of the at least two or more coolant outlets is introduced back into the integral valve through the at least one or more coolant inlets after being supplied to a portion where coolant circulation is required; and a heat pump device disposed in at least one or more of the plurality of coolant paths to selectively adjust a temperature of the coolant. The integral valve, a part of the plurality of coolant paths, and the heat pump device may form one valve module.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DESCRIPTION OF SYMBOLS

Figure 1:
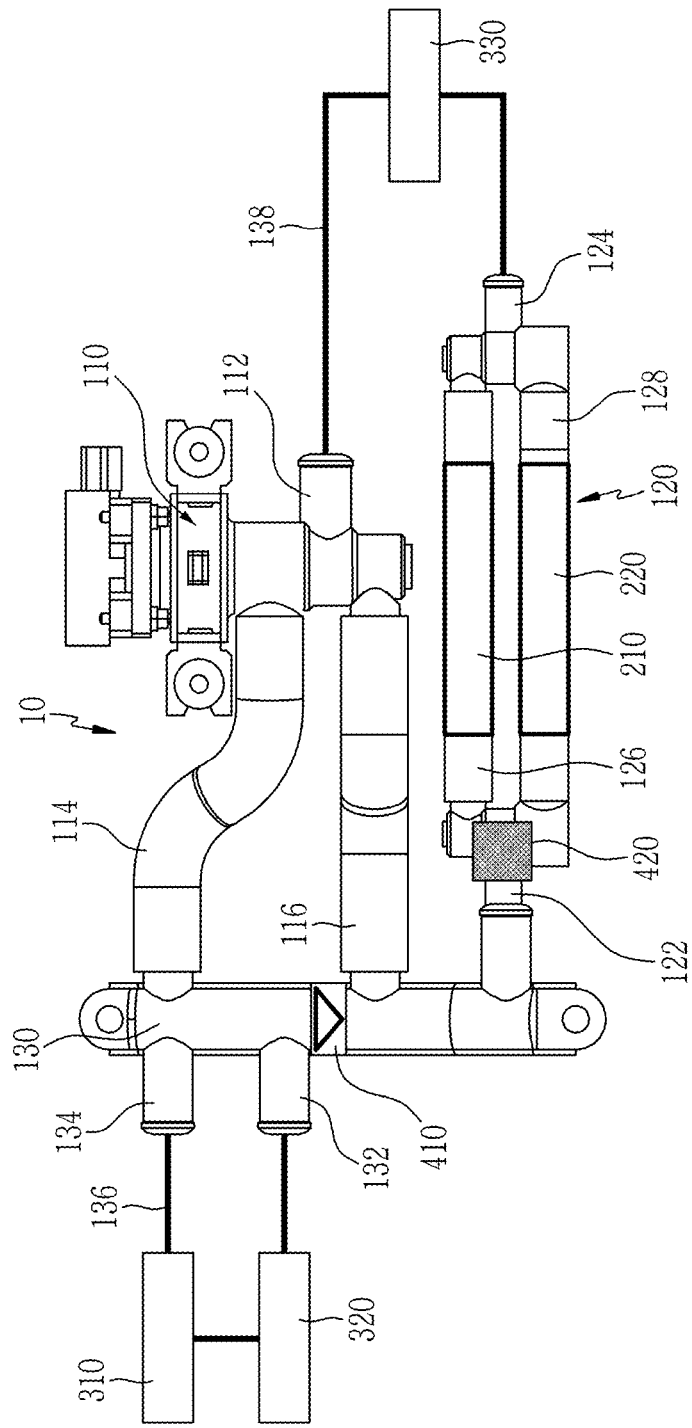
FIG. 1 is a schematic diagram of a cooling system of an electric vehicle according to an exemplary embodiment of the present invention.

10: valve module
110: integral valve
112: integral valve inlet path
114: first integral valve outlet path
116: second integral valve outlet path
120: heat pump device
122: heat pump device inlet path
124: heat pump device outlet path
126: heating branch path
128: cooling branch path
130: integral circulation portion
132: integral circulation portion inlet path
134: integral circulation portion outlet path
136: first circulation path
138: second circulation path
210: heating portion
212: high temperature refrigerant inlet
214: high temperature refrigerant outlet
220: cooling portion
222: low temperature refrigerant inlet
224: low temperature refrigerant outlet
230: evaporator
240: heat pump condenser
310: radiator
320: condenser
330: electrically powered device
410: check valve
420: conversion valve

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will hereinafter be described in detail with reference to the accompanying drawings.

FIG. 1 is a schematic diagram of a cooling system of an electric vehicle according to an exemplary embodiment of the present invention. As shown in FIG. 1, a cooling system of an electric vehicle according to an exemplary embodiment of the present invention is applied to an electric vehicle (EV), which is a generic name of an electrically powered vehicle, and may include a valve module 10 configured to vary a circulation path of coolant based on an operating state of the vehicle, and coolant paths 112, 114, 116, 122, 124, 126, 128, 130, 132, 134, 136, and 138 that are provided for circulation of a coolant in the valve module 10 and peripheral devices 310, 320, and 330.

The valve module 10 may include an integral valve 110, an integral valve inlet path 112, a first integral valve outlet path 114, a second integral valve outlet path 116, a heat pump device 120, a heat pump device inlet path 122, a heat pump device outlet path 124, an integral circulation portion 130, an integral circulation portion outlet path 134, an integral circulation portion inlet path 132, and a check valve 410. The valve module may be operated by a controller within the vehicle.

In particular, the integral valve 110 may be configured to receive a coolant circulated while cooling an engine (not shown) or a driving motor (not shown), which is a power source of the electric vehicle, and may be configured to supply the coolant to the peripheral devices 310, 320, and 330 that require circulation of the coolant, and receive a coolant passed through the peripheral devices 310, 320, and 330 and supply the coolant back to the engine or the drive motor and the peripheral devices 310, 320, and 330. In other words, the integral valve 110 is a valve that controls coolant circulation of the electric vehicle, and a path through which a coolant flows into the integral valve 110 from the engine or the driving motor, which is obvious to those skilled in the art (i.e., a person skilled in the art), will not be described.

The integral valve inlet path 112 is another coolant inlet through which the coolant may flow into the integral valve 110 in addition to a path through which the coolant flows into the integral valve 110 from the engine or the driving motor. In addition, the integral valve inlet path 112 may be formed in the integral valve 110 such that the integral valve 110 receives a coolant passed through the peripheral devices 310, 320, and 330.

The first integral valve outlet path 114 is one of coolant outlets through which a coolant may be selectively discharged from the integral valve 110. In addition, the first integral valve outlet path 114 may be formed in the integral valve 110 such that the integral valve 110 discharges a coolant. The second integral valve outlet path 116 is another coolant outlet through which a coolant may be selectively discharged from the integral valve 110. In addition, the second integral valve outlet path 116 may be formed in the integral valve 110 such that the integral valve 110 discharges a coolant. In other words, the integrated valve 110 functions to allow the coolant introduced into the integral valve inlet path 112 to be discharged through one of the first integral valve outlet path 114 and the second integral valve outlet path 116.

The heat pump device 120 may include a heat pump embedded therein, and may be configured to selectively adjust a temperature of a coolant. In addition, regardless of whether the function of the heat pump device 120 is performed, the coolant that has passed through the first integral valve output path 114 of the second integral valve output path 116 via the integral valve 110 always circulates in the heat pump device 120. In particular, the heat pump, which is a cooling and heating device that transmits a low-temperature heat source by heating to a high temperature or transmits a high-temperature heat source by cooling to a lower temperature using a refrigerant or condensation heat, is obvious to a person skilled in the art, and therefore no detailed description will be provided.

The heat pump device inlet path 122 is a coolant inlet through which the coolant may be introduced into the heat pump device 120 from the first integral valve outlet path 114 or the second integral valve outlet path 116. In addition, the heat pump device inlet path 122 may be formed in the heat pump device 120 such that the heat pump device 120 may receive the coolant. The heat pump device outlet path 124 is a coolant outlet through which a coolant may be discharged from the heat pump device 120. In addition, the heat pump device outlet path 124 may be formed in the heat pump device 120 such that the heat pump device 120 may discharge a coolant.

The integral circulation portion 130 may be in communication with the first integral valve outlet path 114, the second integral valve outlet path 116, and the heat pump device inlet path 122 to circulate a coolant passed through the first integral valve outlet path 114 or the second integral valve outlet path 116 in the heat pump device 120. The integral circulation portion outlet path 134 is another coolant outlet through which a coolant may be discharged from the integral circulation portion 130 in addition to a path through which a coolant is discharged to the heat pump device inlet path 122 from the integral circulation portion 130. In addition, the integral circulation portion outlet path 134 may be formed in the integral circulation portion 130 such that the integral circulation portion 130 may discharge a coolant. Further, the integral circulation portion outlet path 134 may be disposed, while opposing the first integral valve outlet path 114 such that a coolant introduced into the integral circulation portion 130 may be discharged through the first integral valve outlet path 114.

The integral circulation portion inlet path 132 is another coolant inlet through which a coolant may be introduced into the integral circulation portion 130, in addition to a path through which a coolant is introduced into the integral circulation portion 130 from the first integral valve outlet path 114 or the second integral valve outlet path 116. In addition, the integral circulation portion inlet path 132 may be formed in the integral circulation portion 130 such that the integral circulation portion 130 may receive a coolant. Meanwhile, when a circulation direction of the coolant with reference to the integral circulation portion 130 is set to a length direction of the integral circulation portion 130, the integral circulation portion outlet path 134 and the first integral valve outlet path 114 may be disposed on the same line along the length direction of the integral circulation portion 130, the second integral valve outlet path 116 may be disposed between the first integral valve outlet path 114 and the heat pump device inlet path 122, and the integral circulation portion inlet path 132 may be disposed between the first integral valve outlet path 114 and the second integral valve outlet path 116. Further, a portion where the integral circulation portion outlet path 134 is formed and a portion where the integral circulation portion inlet path 132 is formed may be partitioned in the integral circulation portion 130, but the present invention is not limited thereto.

Additionally, the check valve 410 may be disposed in the integral circulation portion 130. In particular, the check valve 410 may be disposed between the second integral valve outlet path 116 and the integral circulation portion inlet path 132 in a length direction of the integral circulation portion 130. The check valve 410 prevents a coolant passed through the second integral valve outlet path 116 from flowing backward toward the first integral valve outlet path 114, the integral circulation portion outlet path 134, and the integral circulation portion inlet path 132 when the coolant is circulated to the heat pump device inlet path 122 through the integral circulation portion 130.

The valve module 10 may further include a heating branch path 126, a cooling branch path 128, a heating portion 210, a cooling portion 220, and a conversion valve 420. The heating branch path 126 is a coolant path branched from the heat pump device inlet path 122, and in communication with the heat pump device outlet path 124. In other words, the heating branch path 126 may be formed in the heat pump device 120 to discharge a coolant introduced into the heat pump device inlet path 122 to the heat pump device outlet path 124 via the heat pump device 120. The cooling branch path 128 is another coolant path branched from the heat pump device inlet path 122, and in communication with the heat pump device outlet path 124. In other words, the cooling branch path 128 may be formed in the heat pump device 120 to discharge a coolant introduced into the heat pump device inlet path 122 to the heat pump device outlet path 124 via the heat pump device 120.

The heating portion 210 is a part of a heat pump embedded in the heat pump device 120, and may be disposed in the heating branch path 126. In addition, the heating portion 210 may be configured to selectively increase a temperature of a coolant that passes through the heating branch path 126. The cooling portion 220 is a part of the heat pump embedded in the heat pump device 120, and may be disposed in the cooling branch path 128. In addition, the cooling portion 220 may be configured to selectively decrease a temperature of a coolant that passes through the cooling branch path 128.

Further, the conversion valve 420 may be disposed in a portion where the heating branch path 126 and the cooling branch path 128 are branched from the heat pump device inlet path 122. The conversion valve 420 may be configured to allow the coolant passed through the heat pump device inlet path 122 to pass through one or both of the heating branch path 126 and the cooling branch path 128. The peripheral devices 310, 320, and 330 may include a radiator 310, a condenser 320, and an electrically powered device 330. The radiator 310 may be configured to discharge heat of a coolant to the air and the condenser 320 may be configured to condense an evaporated refrigerant by using the coolant, and these components are apparent to those skilled in the art so that a detailed description thereof will be omitted.

The electrically powered device 330 is defined to generically refer to power electronics (PE) and a high voltage battery. In other words, as a generic name of a vehicle that uses electricity as power, an electric vehicle to which the cooling system according to the exemplary embodiment of the present invention implies all eco-friendly vehicles in which the power electronics and the high voltage battery are used. Meanwhile, the electrically powered device 330 may be one or both of the power electronics and the high voltage battery. In general, a driving motor, a high voltage battery, a transmission, and a power electronic component are mounted as a power source in an electric vehicle.

Particularly, a power electronic component is a device that performs functions such as converting DC power into AC power, transforming a voltage, synchronizing a connector, and the like, and is well known to those skilled in the art. Additionally, it is also obvious to a person skilled in the art that the high voltage battery supplies power to the driving motor. In such an electric vehicle, properly maintaining a temperature of the electrically powered device 330 may determine the performance of the electric vehicle.

The coolant discharged through the integral circulation portion outlet path 134 from the integral circulation portion 130 may be passed through a first circulation path 136 and then introduced into the integral circulation portion 130 through the integral circulation portion inlet path 132. In addition, the radiator 310 and the condenser 320 may be disposed on the first circulation path 136. In other words, a coolant passed through the first circulation path 136 may be passed through the radiator 310 and the condenser 320.

A coolant discharged through the heat pump device outlet path 124 from the heat pump device 120 may be introduced into the integral valve 110 through the integral valve inlet path 112 after passing through a second circulation path 138. In addition, the electrically powered device 330 may be disposed on the second circulation path 138. In other words, the coolant that passes through the second circulation path 138 may pass through the electrically powered device 330.

Figure 2:
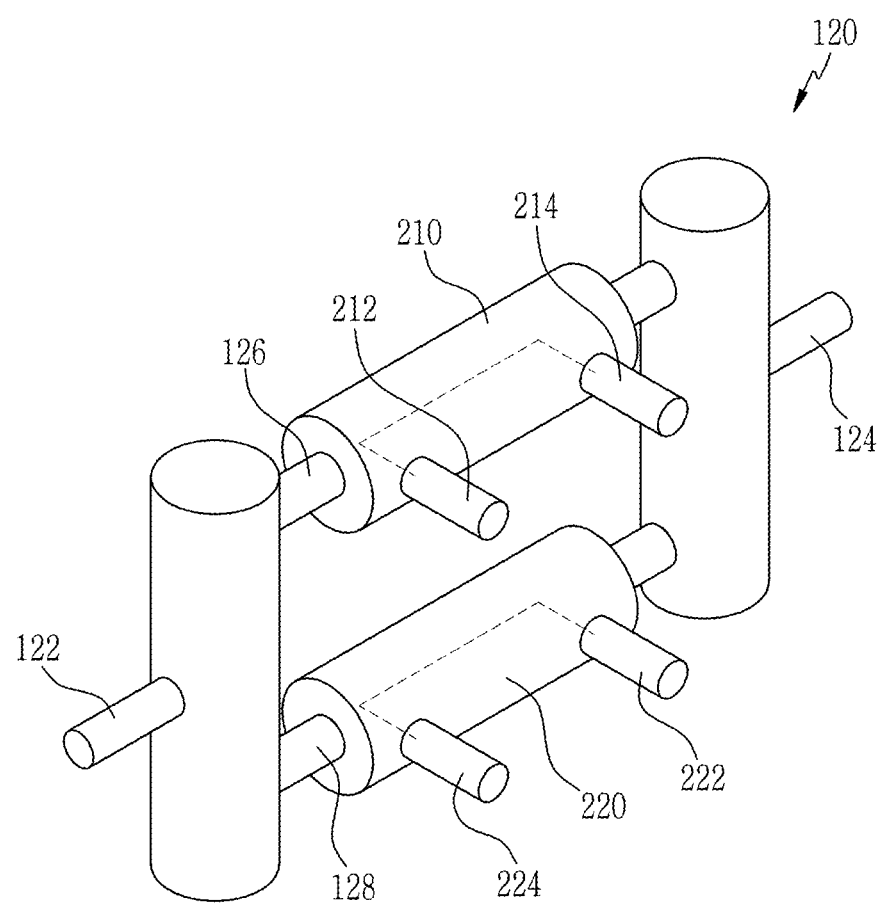
FIG. 2 is a schematic diagram of a heat pump device provided in the cooling system of the electric vehicle according to the exemplary embodiment of the present invention.
Figure 3:
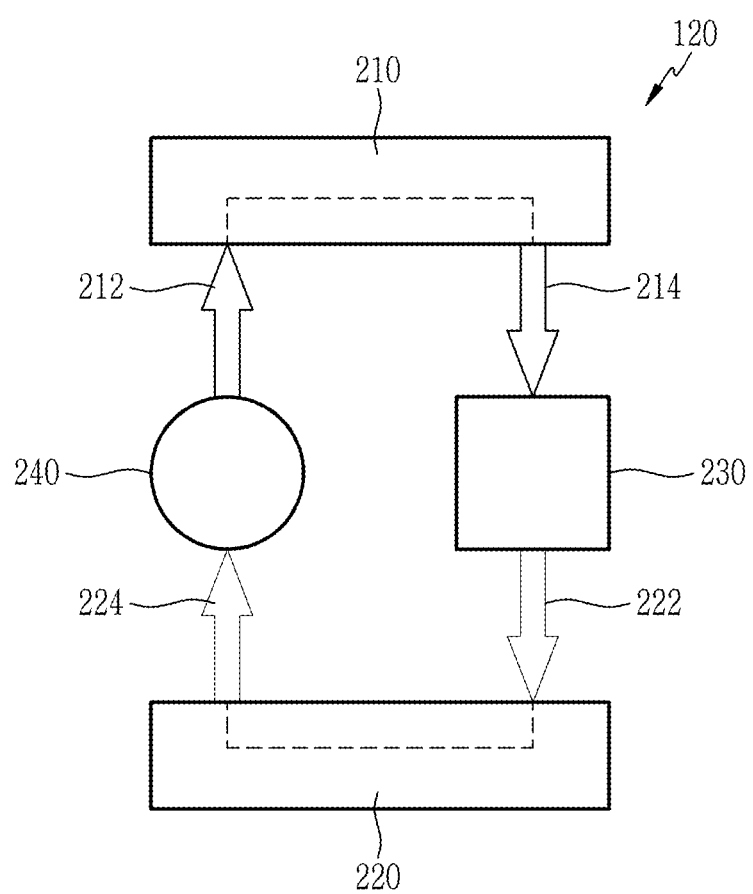
FIG. 3 is a schematic block diagram that shows a function of the heat pump device provided in the cooling system of the electric vehicle according to the exemplary embodiment of the present invention.

Moreover, FIG. 2 is a schematic diagram of the heat pump device provided in the cooling system of the electric vehicle according to the exemplary embodiment of the present invention, and FIG. 3 is a schematic block diagram that shows a function of the heat pump device provided in the cooling system of the electric vehicle according to the exemplary embodiment of the present invention. As shown in FIG. 2 and FIG. 3, the heat pump device 120 may further include a high temperature refrigerant inlet 212, a high temperature refrigerant outlet 214, a low temperature refrigerant inlet 222, a low temperature refrigerant outlet 224, an evaporator 230, and a heat pump condenser 240.

The high temperature refrigerant inlet 212 may be connected to a first end of the heating portion to introduce a high-temperature refrigerant into the heating portion 210. The high temperature refrigerant outlet 214 may be connected to a second end of the heating portion 210 to discharge the high-temperature refrigerant introduced into the heating portion 210 from the heating portion 210. Particularly, refrigerant circulation paths 212 and 214 that connect the high temperature refrigerant inlet 212 and the high temperature refrigerant outlet 214 with each other may be provided in the heating portion 210 to perform heat exchange between the refrigerant and the coolant, while being distinguished with the paths of the coolant. In other words, the high temperature refrigerant inlet 212 and the high temperature refrigerant outlet 214 are a single path, and may respectively refer to a portion through which the refrigerant is introduced into the heating portion 210 and a portion through which the refrigerant is discharged from the heating portion 210.

The low temperature refrigerant inlet 222 may be connected to a first end of the cooling portion 220 to introduce a low-temperature refrigerant into the cooling portion 220. The low temperature refrigerant outlet 224 may be connected to a second end of the cooling portion 220 to discharge a low-temperature refrigerant introduced into the cooling portion 220 from the cooling portion 220. Particularly, refrigerant circulation paths 222 and 224 that connect the low temperature refrigerant inlet 222 may be provided in the cooling portion 220 to perform heat exchange between the refrigerant and the coolant while being distinguished from the paths of the coolant. In other words, the low temperature refrigerant inlet 222 and the low temperature refrigerant outlet 224 are a single path, and may respectively refer to a portion through which the refrigerant is introduced into the cooling portion 220 and a portion through which the refrigerant is discharged from the cooling portion 220.

The evaporator 230 may be disposed between the high temperature refrigerant outlet 214 and the low temperature refrigerant inlet 222. Accordingly, the refrigerant may sequentially pass through the high temperature refrigerant outlet 214, the evaporator 230, and the low temperature refrigerant inlet 222. In addition, the evaporator 230 may be configured to cool the refrigerant that passes therethrough.

The heat pump condenser 240 may be disposed between the low temperature refrigerant outlet 224 and the high temperature refrigerant inlet 212. Accordingly, the refrigerant may sequentially pass through the low temperature refrigerant outlet 224, the heat pump condenser 240, and the high temperature refrigerant inlet 212. In addition, the heat pump condenser 240 may be configured to heat the refrigerant that passes therethrough. Particularly, the refrigerant is a refrigerant of the heat pump, and the heat pump uses a cycle that the refrigerant is vaporized together with the endothermic reaction while being evaporated in an evaporator, and then liquefied the condenser with the heat generating reaction is apparent to a person of an ordinary skill in the art, and accordingly, functions of the evaporator 230 and heat pump condenser 240 will not be described in detail. Meanwhile, the heat pump may be implemented using an air conditioning system of a vehicle, but the present invention is not limited thereto. In other words, the heat pump may be provided as an additional device.

Figure 4:
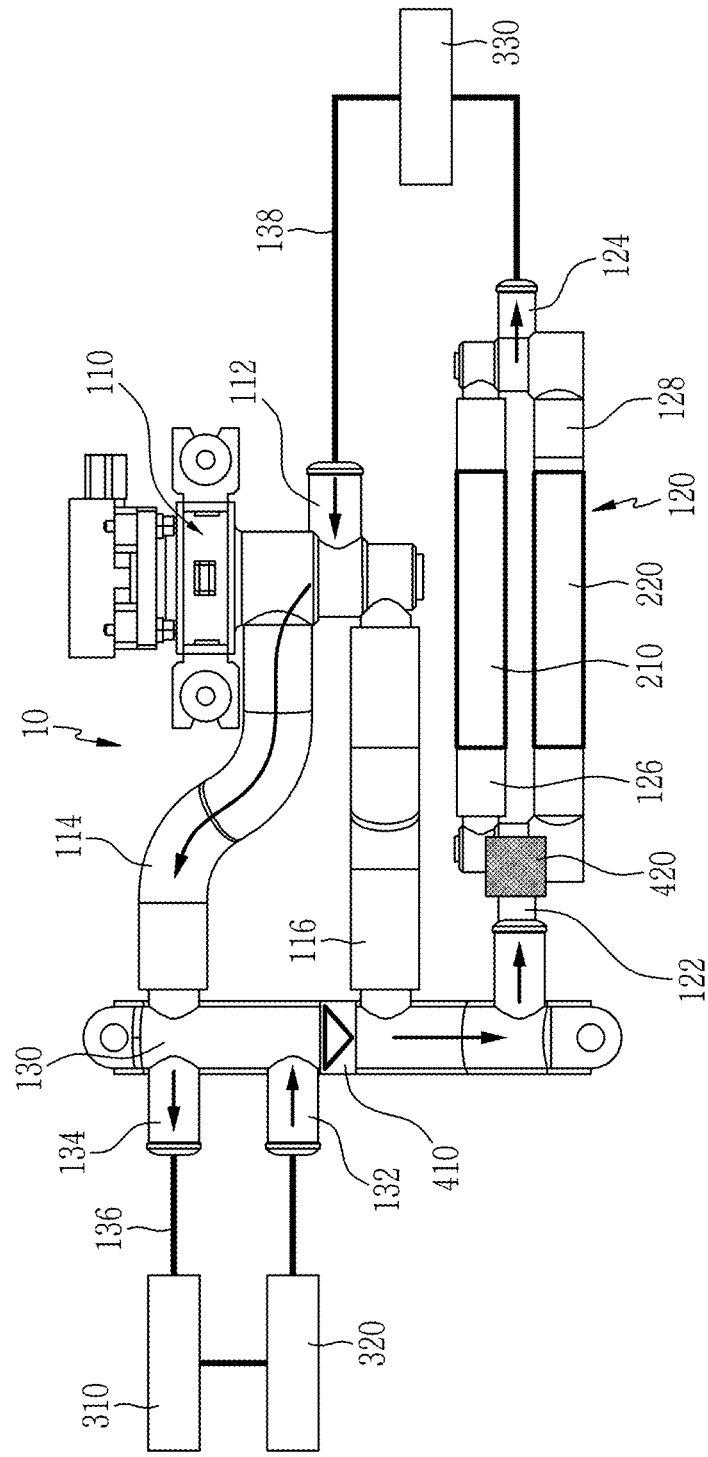
FIG. 4 is an operational diagram that shows circulation of a coolant realized in a coolant high-temperature environment of the cooling system of the electric device according to the exemplary embodiment of the present invention.

FIG. 4 is an operational diagram that shows circulation of a coolant realized in a coolant high-temperature environment of the cooling system of the electric device according to the exemplary embodiment of the present invention. As shown in FIG. 4, since cooling of the coolant using the radiator 310 is required in a coolant high temperature environment, the integral valve 110 may be configured to open the first integral valve outlet path 114 and close the second integral valve outlet path 116. The coolant discharged through the first integral valve outlet path 114 from the integral valve 110 by such an operation of the integral valve 110 may sequentially pass through the integral circulation portion 130, the integral circulation portion outlet path 134, the first circulation path 136, the integral circulation portion inlet path 132, the integral circulation portion 130, and the heat pump device inlet path 122, and then may be introduced into the heat pump device 120.

In particular, when a temperature of the coolant is cooled to a level that exceeds a required level while passing through the radiator 310 such that the temperature of the coolant to be introduced into the heat pump device 120 needs to be increased, the conversion valve 420 may be configured to open the heating branch path 126 and close the cooling branch path 128. The coolant introduced into the heat pump device 120 in such an operation of the conversion valve 420 may pass through the heating portion 210 while passing through the heating branch path 126, and then the coolant of which a temperature is increased while passing through the heating portion 210 may be introduced into the integral valve 110 after being sequentially passed through the heat pump device outlet path 124, the second circulation path 138, and the integral valve inlet path 112. Accordingly, a coolant having a proper temperature may circulate in the electrically powered device 330.

Meanwhile, when the coolant is not cooled sufficient to a required temperature even after being passed through the radiator 310 and thus the temperature of the coolant to be introduced into the heat pump device 120 requires to be further decreased, the conversion valve 420 may be configured to close the heating branch path 126 and open the cooling branch path 128. Thus, the coolant introduced into the heat pump device 120 may be cooled through the cooling portion 220 while passing through the cooling branch path 128 by such an operation of the conversion valve 420, and then introduced into the integral valve 110 after sequentially passing through the heat pump device outlet path 124, the second circulation path 138, and the integral valve inlet path 112. Accordingly, a coolant having a proper temperature may circulate in the electrically powered device 330.

On the other hand, when the coolant passed through the radiator 210 is sufficient cooled to a required temperature and thus there is no need of increasing or decreasing the coolant introduced into the heat pump device 120, the conversion valve 420 may be configured to open at least one of the heating branch path 126 and the cooling branch path 128, and the heat pump device 120 may stop heat exchange between the coolant and the refrigerant. Thus, the coolant introduced into the heat pump device 120 may sequentially pass through the heat pump device outlet path 124, the second circulation path 138, and the integral valve inlet path 112, and then may be introduced into the integral valve 110 without increasing or decreasing the coolant temperature due to the above-stated operations of the conversion valve 420 and heat pump device 120. Accordingly, a coolant having a proper temperature may circulate in the electrically powered device 330.

Figure 5:
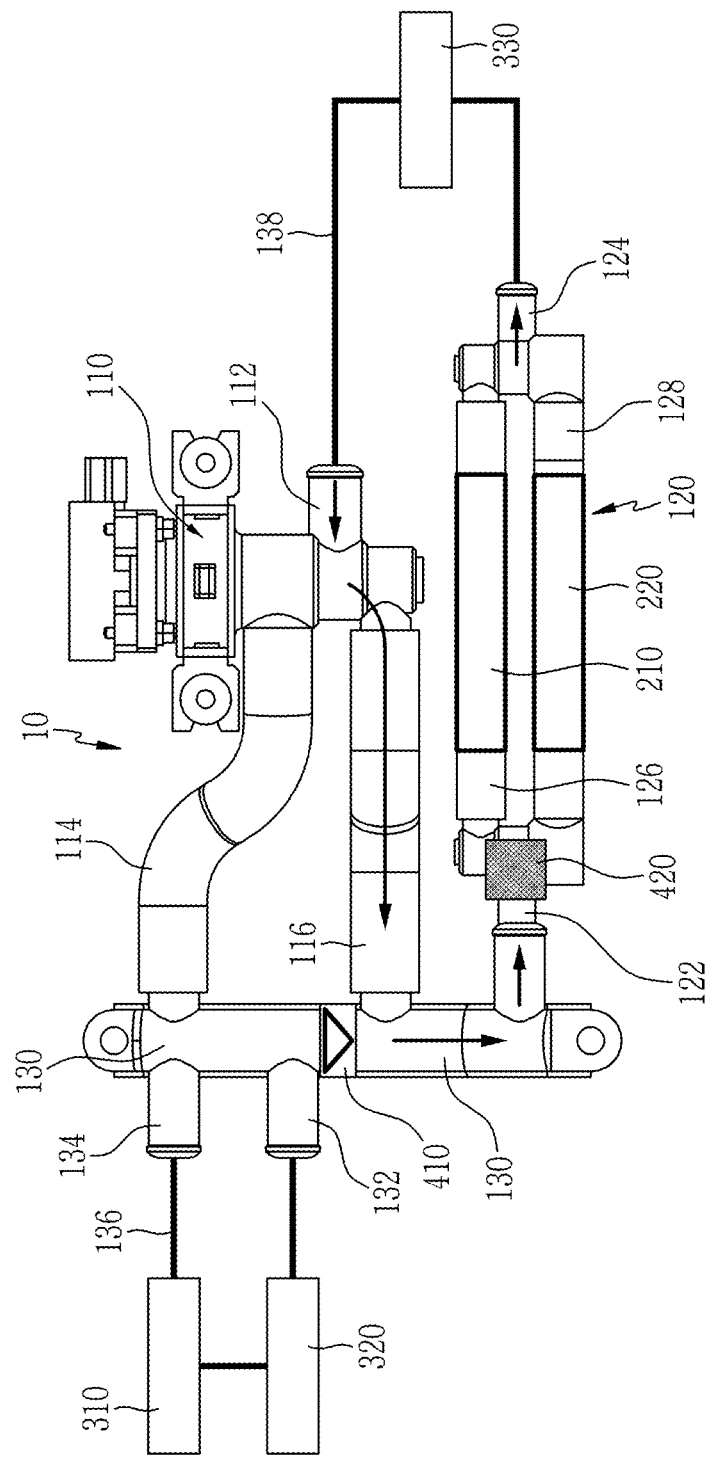
FIG. 5 is an operational diagram that shows coolant circulation realized in a coolant low-temperature environment of the cooling system of the electric vehicle according to the exemplary embodiment of the present invention.

FIG. 5 is an operational diagram that shows coolant circulation realized in a coolant low-temperature environment of the cooling system of the electric vehicle according to the exemplary embodiment of the present invention. As shown in FIG. 5, since cooling of the coolant using the radiator 310 is not required in a coolant low-temperature environment, the integral valve 110 may be configured to close the first integral valve outlet path 114 and open the second integral valve outlet path 116. Due to such an operation of the integral valve 110, the coolant discharged through the second integral valve outlet path 116 from the integral valve 110 may be introduced into the heat pump device 120 after sequentially passing through the integral circulation portion 130 and the heat pump device inlet path 122.

In particular, a temperature of the coolant introduced into the heat pump device 120 requires an increase even through the coolant did not pass through the radiator 310, and thus, the conversion valve 420 may be configured to open the heating branch path 126 and close the cooling branch path 128. The coolant introduced into the heat pump device 120 by such an operation of the conversion valve 420 may be increased in temperature through the heating portion 210 while passing through the heating branch path 126, and then introduced into the integral valve 110 after sequentially passing through the heat pump device outlet path 124, the second circulation path 138, and the integral valve inlet path 112. Accordingly, a coolant having a proper temperature may circulate in the electrically powered device 330.

When it is not required to pass the radiator 310 but the coolant introduced into the heat pump device 120 needs to be decreased in temperature, the conversion valve 420 may be configured to close the heating branch path 126 and open the cooling branch path 128. The coolant introduced into the heat pump device 120 by such an operation of the conversion valve 420 may be decreased in temperature through the cooling portion 220 while passing through the cooling branch path 128, and then introduced into the integral valve 110 by sequentially passing through the heat pump device outlet path 124, the second circulation path 138, and the integral valve inlet path 112. Accordingly, a coolant having a proper temperature may circulate in the electrically powered device 330.

On the other hand, when there is no need to increase or decrease a temperature of the coolant introduced into the heat pump device 120, the conversion valve 420 may be configured to open at least one of the heating branch path 126 and the cooling branch path 128, and the heat pump device 120 may stop heat exchange between the refrigerant and the coolant. The coolant introduced into the heat pump device 120 by the above-described operations of the conversion valve 420 and the heat pump device 120 may sequentially pass through the heat pump device outlet path 124, the second circulation path 138, and the integral valve inlet path 112 without a temperature increase or a temperature decrease, and then may be introduced into the integral valve 110. Accordingly, a coolant having a proper temperature may circulate in the electrically powered device 330.

In the present specification, a method for controlling the valve module 10, such as sensing a temperature of the coolant using a temperature sensor and the like and operating the integral valve 110, the conversion valve 420, and the heat pump device 120 based on the sensed temperature of the cooler using a controller such as a general electronic control unit (ECU) configured to operate electronic devices of the vehicle, and matters related to the method will be omitted. Such a control method of the valve module 10 may be variously implemented depending on designs of person of ordinary skill in the art.

According to the above-described exemplary embodiment of the present invention, the valve module 10 that includes integral valve 110 and the heat pump device 120 is applied to improve cooling efficiency of the electrically powered device 330 with a simplified configuration, and at the same time, a coolant may effectively circulate in the peripheral devices 310 and 320 such as the radiator 310. In addition, a minimal space for providing the valve module 10 is required, which improves the space utilization and eliminates the configuration such as a battery chiller and a battery heater, thereby maximizing space utilization. Furthermore, the elimination of simple configurations and unnecessary configurations may ultimately reduce cost and weight and improve fuel consumption.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A valve module for a cooling system of an electric vehicle, comprising:
   an integral valve that supplies a coolant to a portion where circulation of the coolant is required while cooling a power source of the vehicle, and receives the coolant to supply the received coolant back to the power source and the portion where the coolant circulation is required;
   an integral valve inlet path, which is an inlet through which the coolant is introduced into the integral valve;
   a first integral valve outlet path, which is a first outlet through which the coolant is selectively discharged from the integral valve;
   a second integral valve outlet path, which is a second coolant outlet through which the coolant is selectively discharged from the integral valve;
   a heat pump device through which the coolant passed through the integral valve always passes, and where a heat pump is embedded to selectively increase, decrease, or maintain a temperature of the coolant;
   a heat pump device inlet path, which is an inlet through which the coolant is introduced into the heat pump device;
   a heat pump device outlet path, which is an outlet through which the coolant is discharged from the heat pump device;
   an integral circulation portion that communicates with the first integral valve outlet path, the second integral valve outlet path, and the heat pump device inlet path to introduce the coolant passed through the first integral valve outlet path or the second integral valve outlet path into the heat pump device;
   an integral circulation portion outlet path, which is an outlet that is different from the heat pump device inlet path through which the coolant is discharged from the integral circulation portion;
   an integral circulation portion inlet path, which is an inlet that is different from the first integral valve outlet path and the second integral valve outlet path through which the coolant is introduced into the integral circulation portion; and
   a conversion valve directly connected to the heat pump device inlet path, wherein the conversion valve controls the coolant to pass through at least one of a heating branch path and a cooling branch path,
   wherein the heating branch path and the cooling branch path are directly connected to the heat pump device; and
   wherein the integral valve, the integral valve inlet path, the first and the second integral valve outlet paths, the heat pump device, the heat pump device inlet path, the heat pump device outlet path, the integral circulation portion, the integral circulation portion outlet path, and the integral circulation portion inlet path are integrated into the single valve module.

2. The valve module of claim 1, wherein the integral valve inlet path, the first integral valve outlet path, and the second integral valve outlet path are formed in the integral valve.

3. The valve module of claim 1, wherein the heat pump device inlet path and the heat pump device outlet path are formed in the heat pump device.

4. The valve module of claim 1, wherein the integral circulation portion outlet path and the integral circulation portion inlet path are formed in the integral circulation portion.

5. The valve module of claim 1, wherein the integral circulation portion outlet path is disposed while opposing the first integral valve outlet path to discharge the coolant introduced into the integral circulation portion through the first integral valve outlet path.

6. The valve module of claim 1, wherein the integral circulation portion outlet path and the first integral valve outlet path are disposed on a same line along a length direction of the integral circulation portion, which is a direction in which the coolant circulates in the integral circulation portion, the second integral valve outlet path is disposed between the first integral valve outlet path and the heat pump device inlet path, and the integral circulation portion inlet path is disposed between the first integral valve outlet path and the second integral valve outlet path.

7. The valve module of claim 6, wherein the valve module further includes:
   a check valve disposed between the second integral valve outlet path and the integral circulation portion inlet path in the length direction of the integral circulation portion to prevent a coolant that has passed through the second integral valve outlet path from flowing backward toward the first integral valve outlet path, the integral circulation portion outlet path, and the integral circulation portion inlet path when circulating to the heat pump device inlet path through the integral circulation portion.

8. The valve module of claim 1, wherein the valve module further includes:
the heating branch path that communicates with the heat pump device outlet path as a first coolant path branched from the heat pump device inlet path;
the cooling branch path that communicates with the heat pump device outlet path as a second coolant path branched from the heat pump device inlet path;
a heating portion disposed in the heating branch path to selectively increase a temperature of the coolant passing through the heating branch path, as a part of a heat pump embedded in the heat pump device; and
a cooling portion disposed in the cooling branch path to selectively decrease a temperature of the coolant passing through the cooling branch path, as a part of the heat pump embedded in the heat pump device,
wherein the conversion valve is disposed in a portion where the heating branch path and the cooling branch path are branched from the heat pump device inlet path.

9. The valve module of claim 8, wherein the heating branch path and the cooling branch path are formed in the heat pump device.

10. The valve module of claim 8, wherein the coolant discharged through the integral circulation portion outlet from the integral circulation portion is introduced into the integral circulation portion through the integral circulation portion inlet path after passing through a first circulation path, and a radiator disposed on the first circulation path to pass a coolant, passing through the first circulation path, through the radiator.

11. The valve module of claim 10, wherein the coolant discharged through the heat pump device outlet path from the heat pump device is introduced through the integral valve inlet path after passing through a second circulation path, and an electrically powered device is disposed on the second circulation path to pass the coolant, passing through the second circulation path, through the electrically powered device.

12. The valve module of claim 8, wherein the heat pump device further includes:
a high-temperature refrigerant inlet connected to a first end of the heating portion to introduce a high-temperature refrigerant to the heating portion therethrough;
a high-temperature refrigerant outlet connected to a second end of the heating portion to discharge the high-temperature refrigerant introduced into the heating portion from the heating portion therethrough;
a low-temperature refrigerant inlet connected to a first end of the cooling portion to introduce a low-temperature refrigerant into the cooling portion therethrough;
a low-temperature refrigerant outlet connected to a second end of the cooling portion to discharge the low-temperature refrigerant introduced into the cooling portion from the cooling portion therethrough;
an evaporator disposed between the high-temperature refrigerant outlet and the low-temperature refrigerant inlet; and
a heat pump condenser disposed between the low-temperature refrigerant outlet and the high-temperature refrigerant inlet,
wherein the evaporator is configured to cool a refrigerant while the refrigerant sequentially passing through the high-temperature refrigerant outlet, the evaporator, and low-temperature refrigerant inlet, and the heat pump condenser is configured to heat the refrigerant while the refrigerant sequentially passing through the low-temperature refrigerant outlet, the heat pump condenser, and the high temperature refrigerant inlet.

13. The valve module of claim 12, wherein a refrigerant circulation path is disposed in the heating portion to connect the high-temperature refrigerant inlet and the high-temperature refrigerant outlet for heat exchange between the refrigerant and the coolant while being distinguished from a path of the coolant, and a refrigerant circulation path is disposed in the cooling portion to connect the low-temperature refrigerant inlet and the low-temperature refrigerant outlet for heat exchange between the refrigerant and the coolant while being distinguished from a path of the coolant.

14. The valve module of claim 12, wherein a refrigerant used in an air conditioning system of the vehicle is circulated.

15. The valve module of claim 11, wherein when the integral valve opens the first integral valve outlet path and closes the second integral valve outlet path, the coolant discharged through the first integral valve outlet path from the integral valve sequentially passes through the integral circulation portion, the integral circulation portion outlet path, the first circulation path, the integral circulation portion inlet path, the integral circulation portion, and the heat pump device inlet path, and then is introduced into the heat pump device.

16. The valve module of claim 15, wherein when the conversion valve opens the heating branch path and closes the cooling branch path, the coolant introduced into the heat pump device is increased in temperature through the heating portion while passing through the heating branch path and then introduced into the integral valve after sequentially passing through the heat pump device outlet path, the second circulation path, and the integral valve.

17. The valve module of claim 16, wherein the operation of the integral valve is performed when a coolant requires cooling using the radiator in a coolant high-temperature environment, and the operation of the conversion valve is performed when the coolant cooled through the radiator requires heating.

18. The valve module of claim 15, wherein when the conversion valve closes the heating branch path and opens the cooling branch path, the coolant introduced into the heat pump device is decreased in temperature through the cooling portion while passing through the cooling branch path, and then introduced into the integral valve after sequentially passing through the heat pump device outlet path, the second circulation path, and the integral valve inlet path.

19. The valve module of claim 18, wherein the operation of the integral valve is performed when a coolant requires cooling using the radiator in a coolant high-temperature environment, and the operation of the conversion valve is performed when the coolant requires cooling even after passing through the radiator.

20. The valve module of claim 11, wherein when the integral valve closes the first integral valve outlet path and opens the second integral valve outlet path, the coolant discharged through the second integral valve outlet path from the integral valve is introduced into the heat pump device after sequentially passing through the integral circulation portion and the heat pump device inlet path.

21. The valve module of claim 20, wherein when the conversion valve opens the heating branch path and closes the cooling branch path, the coolant introduced into the heat pump device is increased in temperature through the heating portion while passing through the heating branch path and then introduced into the integral valve after sequentially passing through the heat pump device outlet path, the second circulation path, and the integral valve inlet path.

22. The valve module of claim 21, wherein the operation of the integral valve is performed when the coolant does not require cooling using the radiator in a coolant low-temperature environment, and the operation of the conversion valve is performed when the coolant requires heating even though the coolant did not pass through the radiator.

23. The valve module of claim 20, wherein when the conversion valve closes the heating branch path and opens the cooling branch path, the coolant introduced into the heat pump device is decreased in temperature through the cooling portion while passing through the cooling branch path, and then introduced into the integral valve after sequentially passing through the heat pump device outlet path, the second circulation path, and the integral valve inlet path.

24. The valve module of claim 23, wherein the operation of the integral valve is performed when the coolant does not require cooling using the radiator in a coolant low-temperature environment, and the operation of the conversion valve is performed when the coolant that did not pass through the radiator requires cooling.

25. A valve module for a cooling system of an electric vehicle, comprising:
- an integral valve having at least one or more coolant inlets and at least two or more coolant outlets, and configured to selectively discharge a coolant through one of the at least two or more coolant outlets;
- a heat pump device through which the coolant passed through the integral valve always passes to selectively increase, decrease, or maintain a temperature of the coolant; and
- an integral circulation portion configured to introduce the coolant received from one of the at least two or more coolant outlets of the integral valve into the heat pump device,
- wherein the integral valve, the heat pump device, and the integral circulation portion are integrated into the single valve module.

* * * * *